US008730881B2

(12) United States Patent  
Fang et al.

(10) Patent No.: US 8,730,881 B2  
(45) Date of Patent: May 20, 2014

(54) METHOD, SYSTEM AND APPARATUS FOR IMPLEMENTING CELL HANDOVER

(75) Inventors: Jiayi Fang, Beijing (CN); Guojun Xiao, Beijing (CN); Wei Bao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 447 days.

(21) Appl. No.: 12/810,553

(22) PCT Filed: Dec. 26, 2008

(86) PCT No.: PCT/CN2008/002096  
§ 371 (c)(1),  
(2), (4) Date: Aug. 20, 2010

(87) PCT Pub. No.: WO2009/092206  
PCT Pub. Date: Jul. 30, 2009

(65) Prior Publication Data  
US 2010/0322118 A1 Dec. 23, 2010

(30) Foreign Application Priority Data  
Dec. 26, 2007 (CN) .......................... 2007 1 0304241

(51) Int. Cl.  
*H04W 36/08* (2009.01)  
*H04W 36/00* (2009.01)  
*H04W 28/18* (2009.01)  
*H04J 3/00* (2006.01)  
*H04L 5/22* (2006.01)

(52) U.S. Cl.  
CPC .......... *H04W 36/08* (2013.01); *H04W 36/0016* (2013.01); *H04W 28/18* (2013.01); *H04J 3/00* (2013.01); *H04L 5/22* (2013.01)  
USPC ............................ 370/329; 370/280; 455/439

(58) Field of Classification Search  
None  
See application file for complete search history.

(56) References Cited

U.S. PATENT DOCUMENTS

| | | | | |
|---|---|---|---|---|
| 5,345,448 A | * | 9/1994 | Keskitalo | 370/331 |
| 5,392,453 A | * | 2/1995 | Gudmundson et al. | 455/444 |
| 5,613,203 A | * | 3/1997 | Dupuy et al. | 455/436 |
| 5,870,675 A | * | 2/1999 | Tuutijarvi et al. | 455/436 |

(Continued)

FOREIGN PATENT DOCUMENTS

| | | |
|---|---|---|
| CN | 1750702 A | 3/2006 |
| CN | 1816198 A | 8/2006 |
| CN | 1878392 A | 12/2006 |

OTHER PUBLICATIONS

International Search Report: PCT/CN2008/002096.

*Primary Examiner* — Bunjob Jaroenchonwanit  
(74) *Attorney, Agent, or Firm* — Ladas & Parry LLP

(57) ABSTRACT

It is disclosed a method and system for implementing a cell handover, which are used to solve the problem in the prior art that the cell handover can not be implemented when a target cell uses a TDD mode. The method for implementing the cell handover includes: when a user terminal needs perform the cell handover, a network side sending a cell handover command to the user terminal; when the target cell uses the TDD mode and the cell handover command carries TDD slot configuration information of the target cell, the user terminal implementing the cell handover according to the TDD slot configuration information in the cell handover command. It is further disclosed a user terminal and a Base Station, which are used to implement the cell handover in a TDD system.

18 Claims, 7 Drawing Sheets

(56) References Cited

U.S. PATENT DOCUMENTS

| | | | |
|---|---|---|---|
| 5,884,175 A * | 3/1999 | Schiefer et al. | 455/436 |
| 6,072,787 A * | 6/2000 | Hamalainen et al. | 370/335 |
| 6,122,500 A * | 9/2000 | Dent et al. | 455/414.1 |
| 6,366,781 B1 * | 4/2002 | Hussain et al. | 455/456.5 |
| 6,385,452 B1 * | 5/2002 | Zadeh et al. | 455/440 |
| 6,408,172 B1 * | 6/2002 | Alperovich et al. | 455/404.1 |
| 6,418,310 B1 * | 7/2002 | Dent | 455/418 |
| 6,424,638 B1 * | 7/2002 | Ray et al. | 370/331 |
| 6,438,377 B1 * | 8/2002 | Savolainen | 455/439 |
| 6,470,185 B2 * | 10/2002 | Kangas et al. | 455/456.1 |
| 6,516,193 B1 * | 2/2003 | Salmela et al. | 455/432.3 |
| 6,522,887 B2 * | 2/2003 | Larsson et al. | 455/456.5 |
| 6,570,860 B2 * | 5/2003 | Hamalainen et al. | 370/329 |
| 6,577,866 B1 * | 6/2003 | Roberts | 455/436 |
| 6,907,014 B1 * | 6/2005 | Kitade | 370/280 |
| 6,999,765 B2 * | 2/2006 | Hokao | 455/436 |
| 8,042,033 B2 * | 10/2011 | Karmanenko et al. | 714/807 |
| 8,204,024 B2 * | 6/2012 | Li et al. | 370/335 |
| 8,224,326 B1 * | 7/2012 | Patini | 455/436 |
| 2002/0131381 A1 * | 9/2002 | Kim et al. | 370/335 |
| 2003/0214928 A1 * | 11/2003 | Chuah | 370/336 |
| 2005/0059390 A1 * | 3/2005 | Sayers et al. | 455/425 |
| 2005/0070287 A1 * | 3/2005 | Cave et al. | 455/436 |
| 2005/0227665 A1 * | 10/2005 | Murray et al. | 455/333 |
| 2005/0272426 A1 * | 12/2005 | Yang et al. | 455/436 |
| 2006/0019664 A1 * | 1/2006 | Nelakanti et al. | 455/436 |
| 2006/0153282 A1 * | 7/2006 | Jung et al. | 375/146 |
| 2008/0096496 A1 * | 4/2008 | Yoon | 455/102 |
| 2008/0137562 A1 * | 6/2008 | Li et al. | 370/280 |
| 2008/0287137 A1 * | 11/2008 | Li et al. | 455/450 |
| 2008/0318572 A1 * | 12/2008 | Falaki et al. | 455/436 |
| 2009/0129304 A1 * | 5/2009 | Kim et al. | 370/311 |
| 2009/0129317 A1 * | 5/2009 | Che et al. | 370/328 |
| 2009/0239538 A1 * | 9/2009 | Motegi et al. | 455/436 |
| 2010/0074165 A1 * | 3/2010 | Yokota | 370/315 |
| 2010/0189074 A1 * | 7/2010 | Liao | 370/331 |
| 2010/0195640 A1 * | 8/2010 | Park et al. | 370/350 |
| 2010/0238903 A1 * | 9/2010 | Kitazoe | 370/332 |
| 2011/0002321 A1 * | 1/2011 | Iwai et al. | 370/342 |
| 2011/0116468 A1 * | 5/2011 | Zhu | 370/331 |
| 2011/0276701 A1 * | 11/2011 | Purnadi et al. | 709/227 |
| 2012/0188987 A1 * | 7/2012 | Chin et al. | 370/335 |

* cited by examiner

METHOD, SYSTEM AND APPARATUS FOR IMPLEMENTING CELL HANDOVER

CROSS REFERENCE TO RELATED APPLICATIONS

This application is a U.S. national stage filing of International Application No. PCT/CN2008/002096, filed Dec. 26, 2008, claiming priority from Chinese Application No. 200710304241.5, filed Dec. 26, 2007, which are both incorporated herein by reference in their entirety.

FIELD OF THE INVENTION

The present invention relates to the field of communications and particularly to a cell handover method, system and device.

BACKGROUND OF THE INVENTION

The Long Term Evolution (LTE) system is currently under standardization by the 3GPP, and in the LTE system, Orthogonal Frequency Division Multiplexing (OFDM) is adopted at the physical layer, a dedicated channel is dispensed with, and physical resources are shared among all users and allocated by a Base Station (The term of "Base Station" should be understood as being synonymous with "evolved Node B" in the present invention).

According to the current LTE specification, a cell handover flow of a User Equipment (UE) in an LTE system as illustrated in FIG. 1 includes the following operations S101 to S105.

S101. The UE transmits to a source cell a measurement report including information on a measurement result, e.g., reception strength of a pilot signal, etc.

S102. The source cell transmits to a target cell a cell handover request including context information of the UE upon reception of the measurement report.

S103. The target cell generates a cell handover command from the cell handover request, and transmits to the source cell an acknowledgment message for the cell handover request, which includes the cell handover command.

S104. The source cell forwards the cell handover command to the UE.

S105. The UE performs a random access and a subsequent process in response to the cell handover command.

In the LTE system, it is not desirable for the UE to fetch system information of the target cell during a handover in order to reduce a delay due to an interruption of the handover, therefore, certain system information of the target cell has to be put into the cell handover command and transmitted from the source cell to the UE.

During a handover, the UE performs a random access to the target cell for the purpose of acquiring uplink synchronization information in the target cell and transmitting a handover completion message to the target cell. A specific random access may be performed in the following two modes a) and b).

a) In a contention-based mode, a specific random access flow as illustrated in FIG. 2 includes the following operations S201 to S204.

S201. A UE transmits a random access preamble (which is referred to as Msg1 hereinafter) to an evolved Node B (eNB) in the uplink direction, where the Msg1 is transmitted over a Physical Random Access Channel (PRACH).

S202. The eNB transmits a random access response (which is referred to as Msg2 hereinafter) in the downlink direction upon reception of the Msg1.

S203. The UE performs uplink scheduled transmission (which is referred to as Msg3 hereinafter) over an uplink resource indicated in its received random access response.

The foregoing Msg2 generally functions to acknowledge the Msg1, feed back timing adjustment information and allocate dynamically the uplink resource for the Msg3. The time when the Msg2 is transmitted is scheduled dynamically by the eNB. Msg2$s$ for a plurality of UEs may be combined for transmission. The duration of a resource required by the Msg2 is one timeslot (TTI), i.e., a sub-frame.

The Msg3 includes upper layer signaling, e.g., a handover confirmation message (Handover Confirm).

S204. The eNB transmits a contention resolution message (which is referred to as Msg4 hereinafter) in the downlink direction upon reception of the Msg3. The Msg4 generally carries a unique identifier of the UE succeeding in the contention.

b) In a contention-free mode, a specific random access flow as illustrated in FIG. 3 includes the following operations S301 to S303.

S301. An eNB at a network side allocates a dedicated random access preamble for a UE.

S302. The UE transmits the dedicated random access preamble (which is referred to as Msg1 hereinafter) in the uplink direction.

S303. The eNB transmits a random access response (which is referred to as Msg2 hereinafter) in the downlink direction upon reception of the random access preamble.

Since the random access preamble is dedicated here, no contention resolution is required.

In the foregoing random accesses, the UE has to know a parameter associated with a control channel of the target cell in order to complete the random access for the following reasons.

In either of the contention-based random access or the contention-free random access, the UE has to receive a Msg2 (a random access response) transmitted over a Physical Downlink Shared Channel (PDSCH), the resource of which is allocated over a Physical Downlink Control Channel (PDCCH) in an LTE system, therefore, the UE has to know in advance a parameter associated with the PDCCH of the target cell during the random access.

For the contention-based random access, the UE has to transmit the Msg3 to which Hybrid Automatic Repeat reQuest (HARQ) transmission is applicable, thus the UE has to monitor whether a Hybrid ARQ ACKnowledgment/Non-ACKnowledgment (HARQ ACK/NAK) signal is fed back by the eNB over a Physcial Harq Information Channel (PHICH), therefore, the UE has to know in advance a parameter associated with the PHICH of the target cell during the monitoring.

For the contention-based random access, the UE has to receive the Msg4 to which HARQ transmission is applicable, thus the UE has to transmit an acknowledgement (ACK) signal corresponding to the Msg4 over a Physcial Uplink Control Channel (PUCCH), therefore, the UE has to know in advance a parameter associated with the PUCCH of the target cell during transmitting the ACK signal.

Timeslots of an LTE Time Division Duplex (TDD) system in the prior art are configured as illustrated in FIG. 4, where a radio frame with a length of 10 ms includes two half-frames each with a length of 5 ms, each half-frame includes four normal sub-frames each with a length of 1 ms and a special sub-frame with a length of 1 ms, and the special sub-frame includes three special timeslots (a DwPTS, a GP and an UpPTS).

A period of the timeslot may be configured as 5 ms and 10 ms respectively.

1) For the configured timeslot period of 5 ms, the two half-frames in a radio frame are identical. Sub-frames 0 and 5 are configured fixedly for the downlink, sub-frames 2 and 7 are configured fixedly for the uplink, and sub-frames 3 and 8, and subframes 4 and 9 may be configured for the uplink or downlink.

2) For the configured timeslot period of 10 ms, the two half-frames in a radio frame are different. Sub-frames 0 and 5 are configured fixedly for the downlink, sub-frames 2, 7, 8 and 9 are configured fixedly for the uplink, and sub-frames 3 and 4 may be configured for the uplink or downlink.

Lengths and usages of the DwPTS, the GP and the UpPTS may be configured respectively as required.

Accordingly, for an LTE TDD system, TDD timeslot configuration information includes the configured timeslot period (5 ms or 10 ms), the uplink or downlink direction of each normal sub-frame, and the configured length and usage of each special timeslot in the special sub-frame.

For a TDD system, a value of a parameter of one or more control channels (e.g. the PDCCH, the PHICH and the PUCCH) is associated with the TDD timeslot configuration.

For example, in the case of the PUCCH (over which an uplink HARQ feedback is carried), the structure of the PUCCH varies with the TDD timeslot configuration, and an improper interpretation (i.e. improper correspondence relationship) may arise due to ignorance of a proportion of timeslots. For example, there exist following two TDD timeslot configurations.

Referring to FIG. 5, the proportion of TDD uplink timeslots to TDD downlink timeslots, i.e., DL:UL is equal to 4:3, and here a feedback signal of the downlink sub-frame 5 is put in the uplink sub-frame 1.

Referring to FIG. 6, the proportion of TDD uplink timeslots to TDD downlink timeslots, i.e., DL:UL is equal to 5:2, and here a feedback signal of the downlink sub-frame 5 is put in the uplink sub-frame 2.

The UE cannot identify the specific uplink sub-frame in which a feedback signal of the downlink sub-frame 5 is put due to ignorance of the proportion of uplink timeslots to downlink timeslots. Consequently, the UE has to know the TDD timeslot configuration information in order to deduct a parameter of a control channel.

In the prior art, however, system information of a target cell needs not to be fetched by a UE, therefore, if a handover target cell operates in the TDD mode, then the UE cannot acquire TDD timeslot configuration information of the target cell, and thus cannot deduct some parameters of a control channel involved during the random access, so that neither the random access nor the handover can be completed, thus hindering normal operation of the system. Further, as currently known, the contents of system information of the target cell carried in a cell handover command during a random handover have not been specified.

In summary, a cell handover can not be implemented in the prior art in the case that the target cell operations in the TDD mode.

SUMMARY OF THE INVENTION

Embodiments of the invention provide a cell handover method and system, a User Equipment and a Base Station to avoid the drawback in the prior art that a cell handover cannot be implemented in the case that the target cell operates in the TDD mode.

A cell handover method according to an embodiment of the invention includes:

Transmitting, at a network side, a cell handover command to a User Equipment for which a cell handover is required; and Implementing, by the User Equipment, the cell handover according to TDD timeslot configuration information of a target cell in the cell handover command if the target cell operates in a TDD mode and the cell handover command carries the TDD timeslot configuration information of the target cell.

A cell handover system according to an embodiment of the invention includes a first network unit, a second network unit and a User Equipment, where:

the first network unit is configured for transmitting a cell handover request to the second network unit when a cell handover is required for the User Equipment, and transmitting a cell handover command generated by the second network unit to the User Equipment;

the second network unit is configured for generating the cell handover command from the cell handover request and transmitting the cell handover command to the first network unit; and the User Equipment is configured for implementing the cell handover according to TDD timeslot configuration information of a target cell in the cell handover command if the target cell operates in a TDD mode and the cell handover command carries the TDD timeslot configuration information.

A User Equipment according to an embodiment of the invention includes a first determination unit, a second determination unit and a first processing unit, where:

the first determination unit is configured for triggering the second determination unit upon determining that a target cell for a handover of the User Equipment operates in the TDD mode in response to a cell handover command transmitted form a network side;

the second determination unit is configured for triggering the first processing unit upon determining that the cell handover command carries TDD timeslot configuration information of the target cell in response to triggering of the first determination unit; and the first processing unit is configured for deducting a parameter of a control channel of the target cell according to the TDD timeslot configuration information in the cell handover command and implementing the cell handover in response to triggering of the second determination unit.

A Base Station according to an embodiment of the invention includes a trigger unit, an analysis unit and a cell handover command generation unit, where:

the trigger unit is configured for triggering the analysis unit upon reception of a cell handover request transmitted from a source cell of a User Equipment;

the analysis unit is configured for determining whether TDD timeslot configuration information of a target cell for a handover of the User Equipment needs to be carried in a cell handover command according to the cell handover request in response to triggering of the trigger unit; and the cell handover command generation unit is configured for generating the cell handover command according to a determination result of the analysis unit and transmitting the cell handover command to the User Equipment through the source cell.

A Base Station according to an embodiment of the invention includes:

a cell handover request unit configured for generating a cell handover request when a cell handover is required for a User Equipment; and a cell handover command transmission unit configured for transmitting to the User Equipment a cell handover command including TDD timeslot configuration information of a target cell for the handover of the User Equipment.

In the embodiments of the invention, when a cell handover is required for a User Equipment, a cell handover command is transmitted from a network side to the User Equipment; if a target cell operates in the TDD mode and the cell handover command carries TDD timeslot configuration information of the target cell, the UE acquires a related parameter of a control channel which is required during a random access according to the TDD timeslot configuration information in the cell handover command, so that the cell handover of the UE can be completed if the target cell operates in the TDD mode without acquiring the TDD timeslot configuration information from a system broadcast of an adjacent cell during the cell handover, thus ensuring the normal operation of the system.

DETAILED DESCRIPTION OF THE EMBODIMENTS

Embodiments of the invention provide a cell handover method and system, a User Equipment and a Base Station, in which if a handover target cell operates in the TDD mode, TDD timeslot configuration information of the target cell is carried in a cell handover command which is to be transmitted to a UE, so that the UE can obtain the TDD timeslot configuration of the target cell upon reception of the cell handover command and further can deduct a parameter of a control channel and implement the cell handover.

The embodiments of the invention are described below in detail with reference to the drawings.

Figure 7:
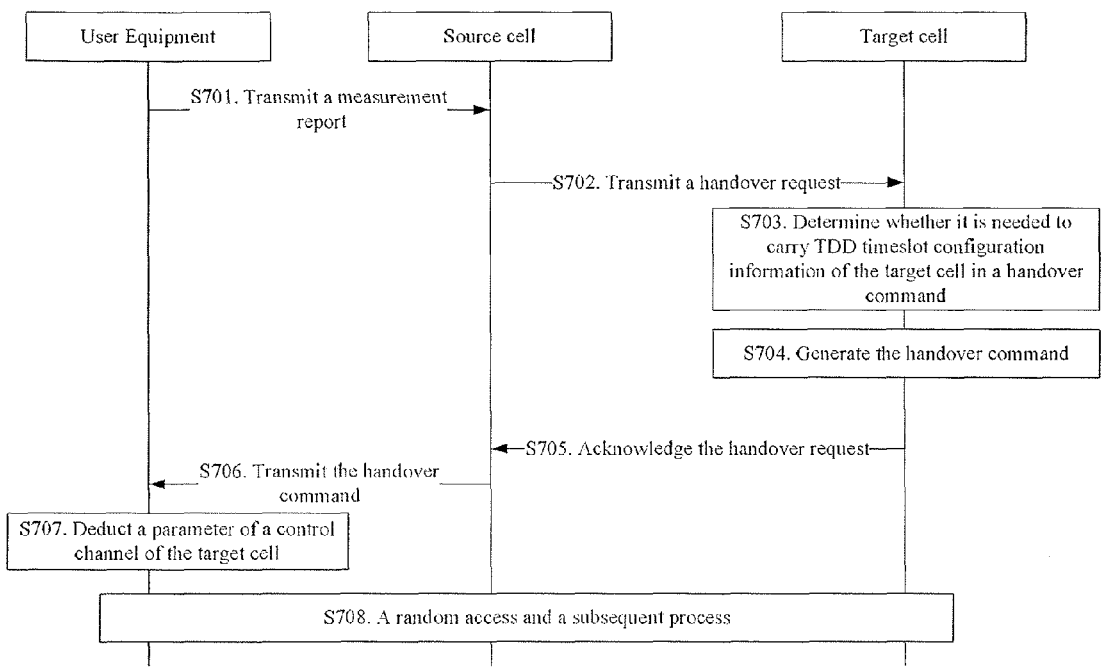
FIG. 7 is a schematic flow diagram of a UE cell handover according to an embodiment of the invention.

Referring to FIG. 7, a cell handover method according to an embodiment of the invention includes the following operations S701 to S708.

S701. A User Equipment transmits a measurement report to a source cell.

The UE may report measurement results of a plurality of cells, e.g., a cell 1, a cell 2, a cell 3, etc., in one measurement report. In an embodiment of the invention, with the use of the measurement report, the UE may inform a network side about cell(s), e.g., the cell 1, a cell 5 (a measurement result of the cell 5 may not be included in the measurement report), etc., of which the TDD timeslot configuration is known to the UE, and the network side determines one of the cells as a handover target cell of the UE upon reception of the measurement report.

S702. The source cell generates a cell handover request from the measurement report sent from the UE and transmits the cell handover request to the target cell, with the cell handover request carrying related information such as context information of the UE and information on whether the source cell operates in the TDD mode, and if the source cell operates in the TDD mode, the related information also includes TDD timeslot configuration information and frequency information of the source cell.

Particularly, the source cell and the target cell may pertain to the same evolved Node B (eNB) or different eNBs.

S703. The target cell determines from the cell handover request transmitted from the source cell whether TDD timeslot configuration information of the target cell needs to be carried in a cell handover command instructing the UE to perform a cell handover.

S704. The target cell generates the corresponding cell handover command according to a determination result in the operation S703, so that if it is determined that the TDD timeslot configuration information needs to be carried, then the generated cell handover command carries the TDD timeslot configuration information; otherwise the generated cell handover command does not carry the TDD timeslot configuration information.

The cell handover command may be generated in various ways, for example, the cell handover command may be generated by the target cell or the source cell alone, or by the target cell and the source cell jointly, that is, each of them may generate a part of the cell handover command. In embodiments of the invention, a cell handover command generated by a target cell alone is described as an example.

S705. The target cell returns to the source cell an acknowledgement message for the cell handover request, which carries the cell handover command generated in the operation S704.

S706. The source cell forwards the cell handover command generated by the target cell to the UE.

S707. The UE deducts a parameter of a control channel of the target cell from the received cell handover command.

Figure 1:
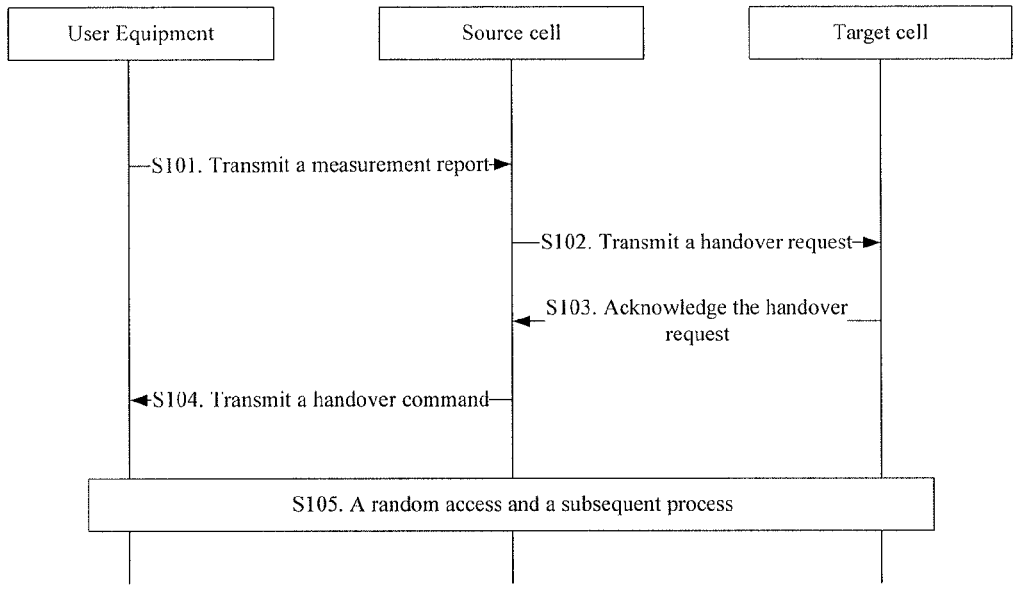
FIG. 1 is a schematic flow diagram of a cell handover in an LTE system in the prior art.
Figure 2:
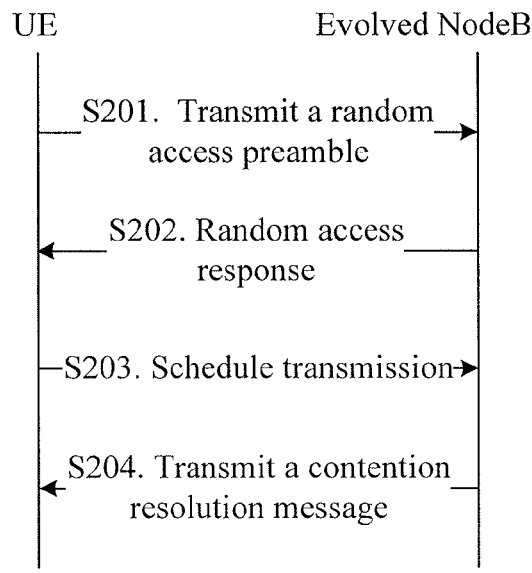
FIG. 2 is a schematic flow diagram of a contention-based random access in the prior art.
Figure 3:
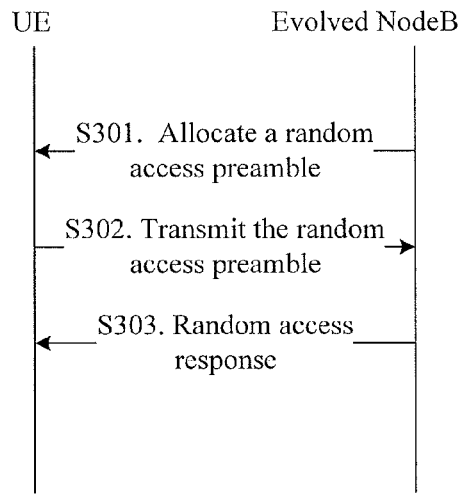
FIG. 3 is a schematic flow diagram of a contention-free random access in the prior art.
Figure 4:
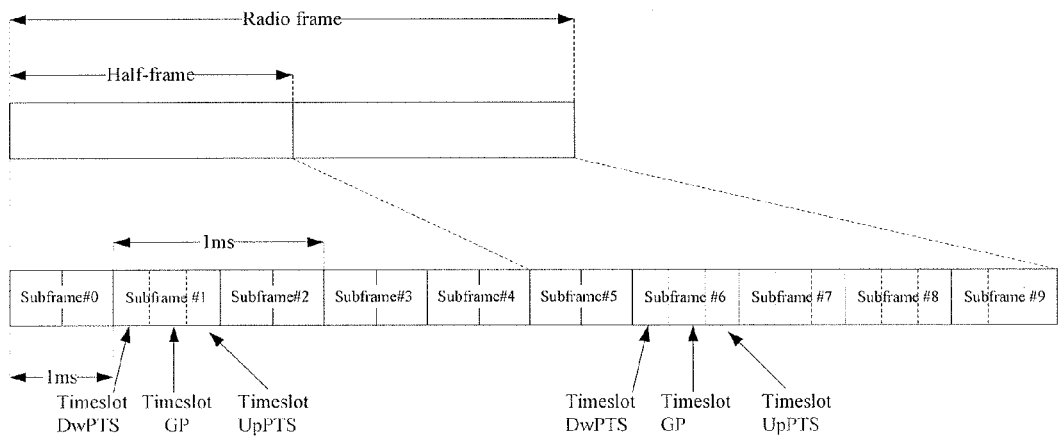
FIG. 4 is a schematic diagram of a timeslot configuration in an LTE TDD system in the prior art.
Figure 5:
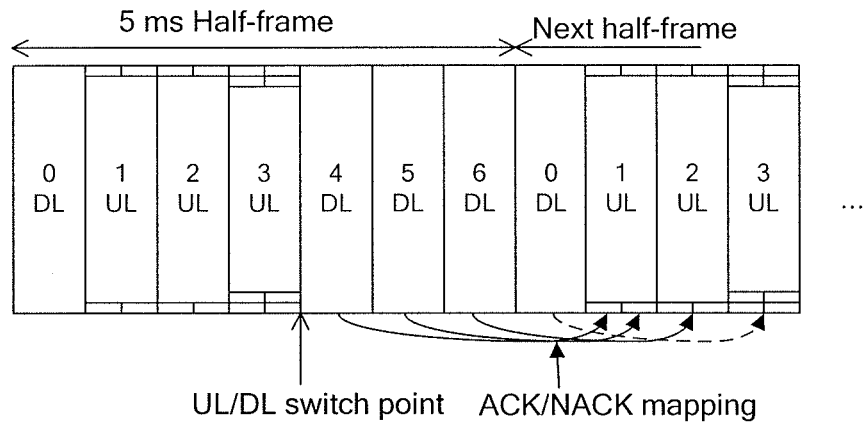
FIG. 5 is a schematic diagram of a TDD timeslot configuration with the proportion of uplink timeslots to downlink timeslots DL:UL equal to 4:3 in the prior art.
Figure 6:
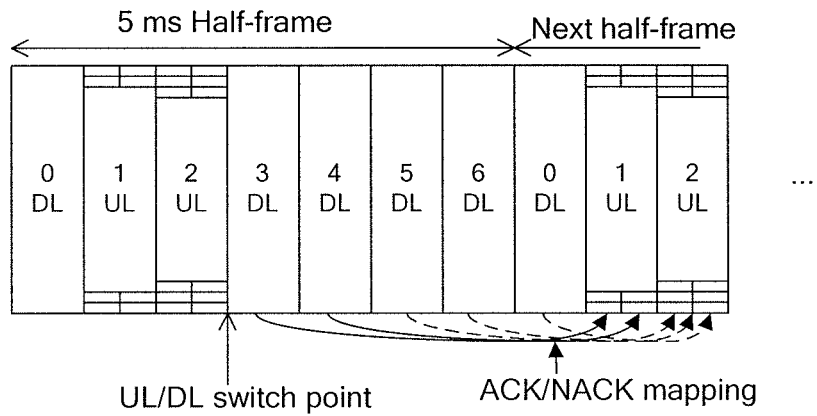
FIG. 6 is a schematic diagram of a TDD timeslot configuration with the proportion of uplink timeslots to downlink timeslots DL:UL equal to 5:2 in the prior art.

S708. The UE performs the random access and the subsequent process as illustrated in FIG. 2 or 3.

In order to save air interface resources and reduce the size of the cell handover command, the cell handover command does not carry the TDD timeslot configuration information of the target cell in any one of the following scenarios 1)-5).

1) The target cell does not operate in the TDD mode.

2) The target cell and the source cell are the same cell.

3) The source cell operates in the TDD mode and has the same TDD timeslot configuration as the target cell.

4) The source cell operates in the TDD mode and has the same operating frequency as the target cell (which means a handover at the same frequency). Since adjacent cells with the same frequency have the same TDD timeslot configuration, the cell handover cell needs not carry the TDD timeslot configuration information of the target cell in this case.

5) The UE has been provided with the TDD timeslot configuration information of the handover target cell prior to the cell handover, and this condition has been known to the network side. For example, the UE may acquire the TDD timeslot configuration information of the target cell by fetching system information of the target cell and transmit the TDD timeslot configuration information to the network side in the measurement report so that this condition may be known to the network side.

Although the TDD timeslot configuration information of the target cell is not carried in the cell handover command, if both the source cell and the target cell operate in the TDD mode, then the UE may assume that the TDD timeslot configuration of the target cell is the same as that of the source cell upon reception of the cell handover command and deduct the parameter of the control channel based upon this assumption.

Figure 8:
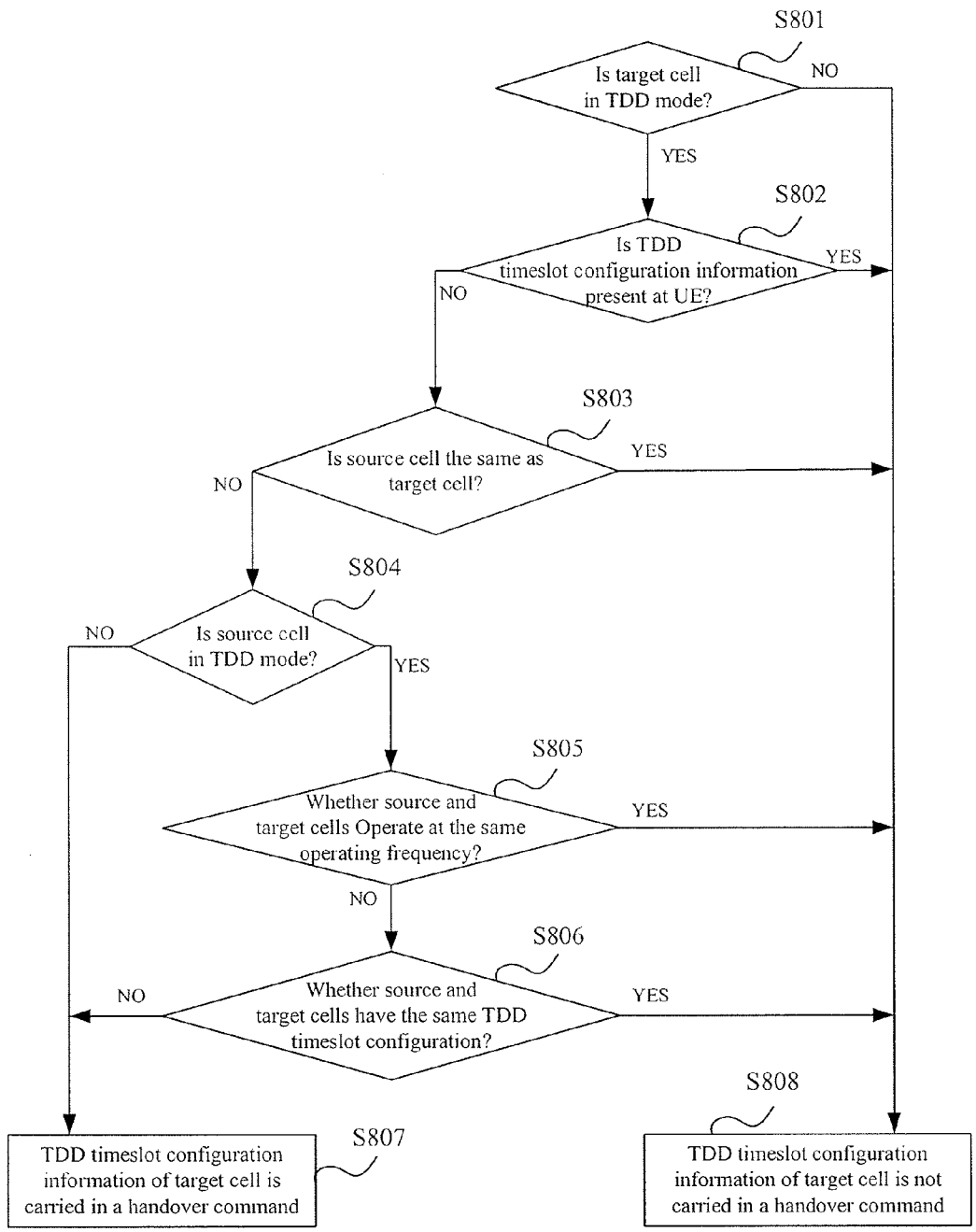
FIG. 8 is a schematic flow diagram of determining whether TDD timeslot configuration information of a target cell needs to be carried in a cell handover command according to an embodiment of the invention.

Referring to FIG. 8, a specific flow of determining whether the TDD timeslot configuration information needs to be carried in the cell handover command generated by the target cell as described in the operation S703 includes the following sub-operations S801 to S808.

S801. It is determined whether the target cell operates in the TDD mode, and if so, then the sub-operation S802 is performed; otherwise, the sub-operation S808 is performed.

S802. It is determined whether the TDD timeslot configuration information of the target cell is known to the UE, and if so, then the sub-operation S808 is performed; otherwise, the sub-operation S803 is performed.

S803. It is determined whether the source cell and the target cell are the same cell, and if so, then the sub-operation S808 is performed; otherwise, the sub-operation S804 is performed.

S804. It is determined whether the source cell operates in the TDD mode, and if so, then the sub-operation S805 is performed; otherwise, the sub-operation S807 is performed.

S805. It is determined whether the source cell and the target cell have the same operating frequency, and if so, then the sub-operation S808 is performed; otherwise, the sub-operation S806 is performed.

S806. It is determined whether the source cell and the target cell have the same TDD timeslot configuration, and if so, then the sub-operation S808 is performed; otherwise, the sub-operation S807 is performed.

S807. It is determined to carry the TDD timeslot configuration information of the target cell in the cell handover command.

S808. It is determined not to carry the TDD timeslot configuration information of the target cell in the cell handover command.

Of course, the invention is not limited to the foregoing determination flow. For example, the sub-operations S805 and S806 may be reversed in order, that is, after determining that the source cell operates in the TDD mode, it is determined whether the source cell and the target cell have the same TDD timeslot configuration, and if so, then the sub-operation S808 is performed; otherwise, it is determined whether the source cell and the target cell have the same operating frequency, and if so, then the sub-operation S808 is performed; otherwise, the sub-operation S807 is performed.

If the target cell determines that it is necessary to carry the TDD timeslot configuration information of the target cell in the cell handover command, the target cell puts the TDD timeslot configuration information of the target cell in the cell handover command and then puts the cell handover command in the message of "Cell Handover Request Acknowledgment" transmitted to the source cell, and the source cell forwards the cell handover command to the UE upon reception thereof.

The format of information included in the cell handover command is illustrated as in the following table, for example.

| Mode of target cell | |
| --- | --- |
| Frequency Division Duplex (FDD) | |
| FDD related parameter | xxx |
| Time Division Duplex (TDD) | |
| TDD timeslot configuration information of target cell is not included | N/A |
| TDD timeslot configuration information of target cell is included | TDD timeslot configuration information of target cell |
| Other TDD parameter | xxxx |

Figure 9:
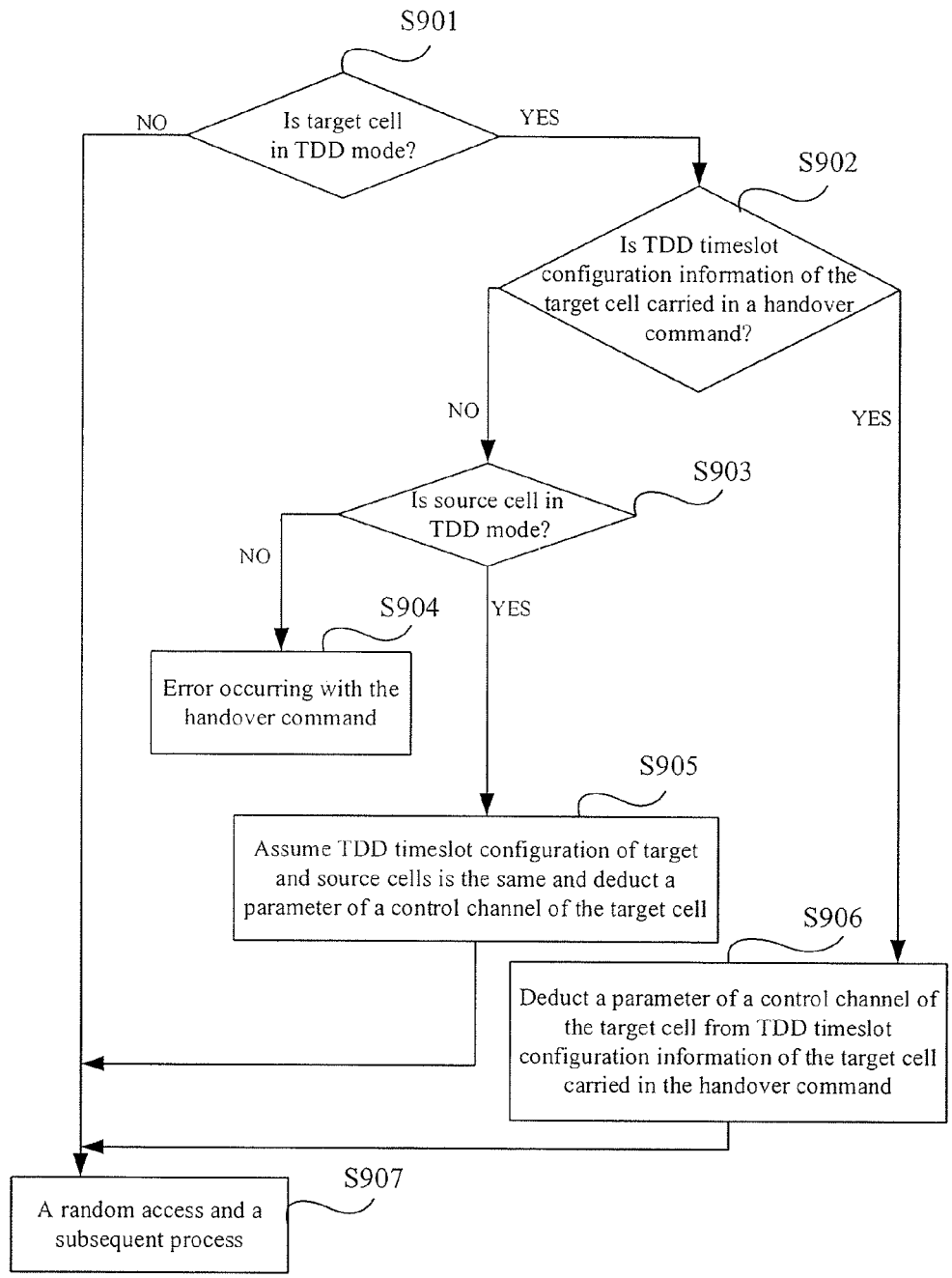
FIG. 9 is a schematic flow diagram of deducting a control parameter of a target cell by a UE according to an embodiment of the invention.

Upon reception of the cell handover command, the UE performs a determination and processing flow as illustrated in FIG. 9, which includes the following operations S901 to S907.

S901. It is determined whether the target cell operates in the TDD mode, and if so, then the operation S902 is performed; otherwise, the operation S907 is performed.

S902. It is determined whether the cell handover command carries the TDD timeslot configuration information of the target cell, and if so, then the operation S906 is performed; otherwise, the operation S903 is performed.

S903. It is determined whether the source cell operates in the TDD mode, and if so, then the operation S905 is performed; otherwise, the operation S904 is performed.

S904. It is determined that an error occurs to the cell handover command, the cell handover command is rejected for execution, and the network side is informed about occurrence of the error of the cell handover command.

S905. It is assumed that the target cell and the source cell have the same TDD timeslot configuration, and the parameter of the control channel of the target cell is deducted from the TDD timeslot configuration information of the source cell.

S906. The parameter of the control channel of the target cell is deducted from the TDD timeslot configuration information of the target cell carried in the cell handover command.

For example, the UE obtains, from the proportion of TDD timeslots in the TDD timeslot configuration information, a specific uplink sub-frame in which a feedback signal of the downlink sub-frame 5 is to be put.

S907. A random access and a subsequent process are performed.

The foregoing cell handover command described in the embodiments of the invention may be differently named as, for example, "RRC reconfiguration message", "physical channel reconfiguration message", etc. Any signalling used for handover control is applicable in the scope of the invention, that is, the specific name of the signalling is of irrelevance to the gist of the invention.

A system and device according to an embodiment of the invention is introduced hereinafter.

Figure 10:
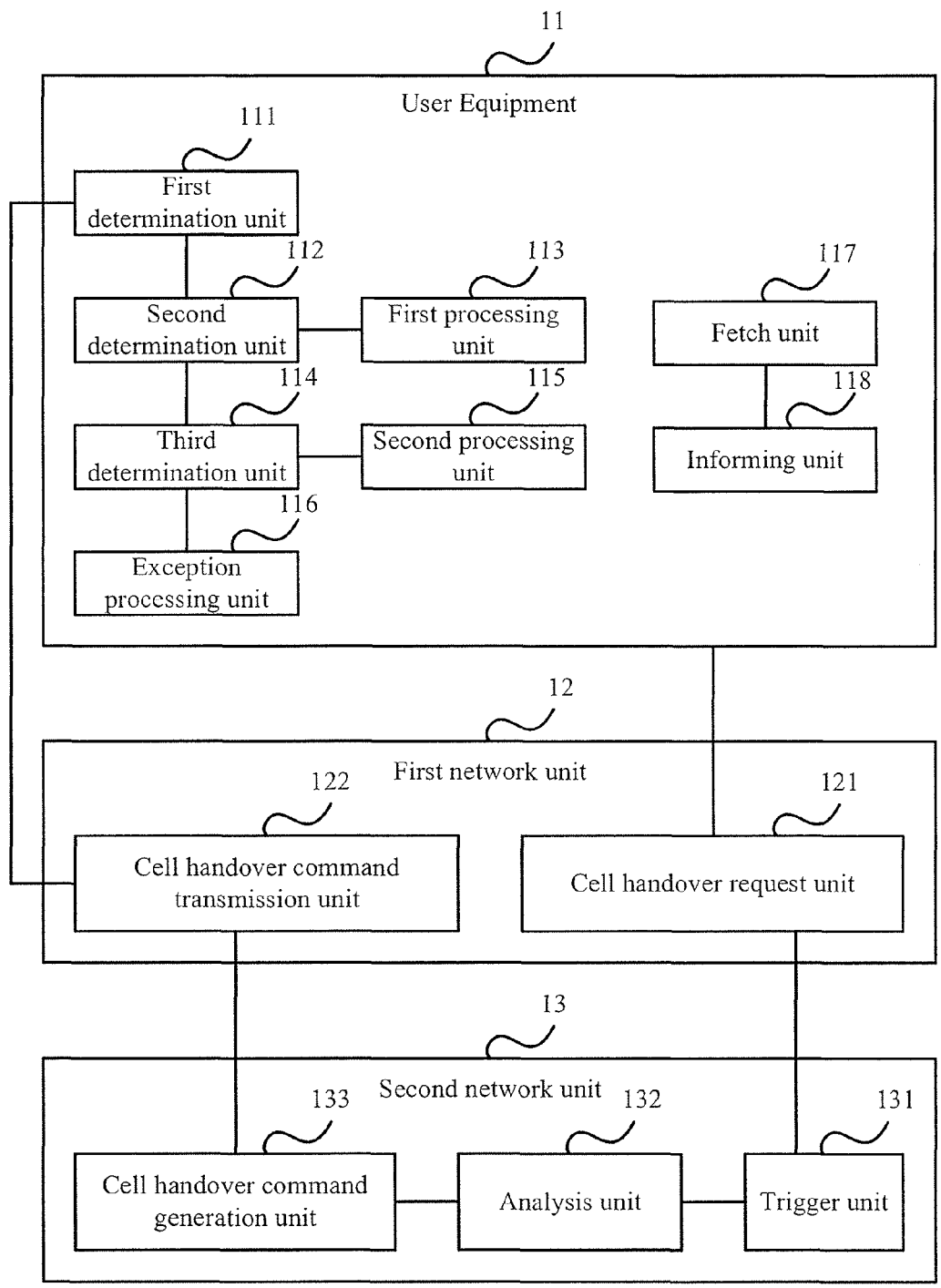
FIG. 10 is a schematic structural diagram of a UE cell handover system according to an embodiment of the invention.

Referring to FIG. 10, a cell handover system according to an embodiment of the invention includes a User Equipment 11, a first network unit 12 and a second network unit 13.

When a cell handover is required for the User Equipment 11, the first network unit 12 transmits a cell handover request to the second network unit 13.

The second network unit 13 generates a cell handover command from the cell handover request and transmits the cell handover command to the first network unit 12.

The first network unit 12 transmits the cell handover command generated by the second network unit 13 to the User Equipment 11.

The User Equipment 11 implements the cell handover according to TDD timeslot configuration information of a target cell in the cell handover command upon determining that the target cell operates in the TDD mode and the cell handover command carries the TDD timeslot configuration information.

Preferably, the User Equipment 11 includes a first determination unit 111, a second determination unit 112 and a first processing unit 113.

The first determination unit 111 is configured for triggering the second determination unit 112 upon determining that the target cell operates in the TDD mode.

The second determination unit 112 is configured for triggering the first processing unit 113 upon determining that the cell handover command carries the TDD timeslot configuration information of the target cell in response to triggering of the first determination unit 111.

The first processing unit 113 is configured for deducting a parameter of a control channel of the target cell from the TDD timeslot configuration information in the cell handover command and implementing the cell handover in response to triggering of the second determination unit 112.

Preferably, the User Equipment further includes a third determination unit 114 and a second processing unit 115.

The second determination unit 112 is configured for triggering the third determination unit 114 upon determining that the cell handover command does not carry the TDD timeslot configuration information.

The third determination unit 114 is configured for triggering the second processing unit 115 upon determining that a source cell where the UE is present operates in the TDD mode in response to triggering of the second determination unit 112.

The second processing unit 115 is configured for deducting the parameter of the control channel of the target cell from TDD timeslot configuration information of the source cell where the UE is present and implementing the cell handover in response to triggering of the third determination unit 114.

Preferably, the User Equipment 11 further includes an exception processing unit 116.

The third determination unit 114 is configured for triggering the exception processing unit 116 upon determining that the source cell where the UE is present is not in the TDD mode.

The exception processing unit 116 is configured for determining occurrence of an error of the cell handover command, rejecting the cell handover command for execution and informing the network side about occurrence of the error of the cell handover command, in response to triggering of the third determination unit 114.

Preferably, the first network unit 12 includes:

a cell handover request unit 121 configured for generating the cell handover request when the cell handover is required for the User Equipment 11; and a cell handover command transmission unit 122 configured for transmitting to the User Equipment 11 the cell handover command generated by the second network unit 13, which may include the TDD timeslot configuration information of the target cell for the handover of the User Equipment 11.

Preferably, the second network unit 13 includes a trigger unit 131, an analysis unit 132 and a cell handover command generation unit 133.

The trigger unit 131 is configured for triggering the analysis unit 132 upon reception of the cell handover request transmitted from the first network unit 12.

The analysis unit 132 is configured for determining, from the cell handover request, whether the TDD timeslot configuration information of the target cell needs to be carried in the cell handover command in response to triggering of the trigger unit 131.

The cell handover command generation unit 133 is configured for generating the cell handover command according to a determination result of the analysis unit 132 and transmitting the cell handover command to the first network unit 12.

Preferably, the analysis unit 132 determines that the TDD timeslot configuration information needs not to be carried in the cell handover command if any of the following conditions is satisfied:

the target cell does not operate in the TDD mode;

the target cell and the source cell are the same cell;

the source cell operates in the TDD mode, and the target cell and the source cell have the same TDD timeslot configuration;

the source cell operates in the TDD mode, and the target cell and the source cell have the same operating frequency; and the User Equipment has been provided with the TDD timeslot configuration information of the target cell.

Preferably, the User Equipment 11 further includes:

a fetch unit 117 configured for acquiring the TDD timeslot configuration information of the target cell by fetching system information of the target cell.

Preferably, the User Equipment 11 further includes:

an informing unit 118 configured for informing the second network unit 13 about its knowledge of the TDD timeslot configuration information of the target cell through the first network unit 12 by transmitting a measurement result to the first network unit 12.

The first network unit 12 and the second network unit 13 may be implemented within the same Base Station or within different Base Stations.

A Base Station according to an embodiment of the invention includes a trigger unit, an analysis unit and a cell handover command generation unit.

The trigger unit is configured for triggering the analysis unit upon reception of a cell handover request transmitted from a source cell of a User Equipment.

The analysis unit is configured for determining from the cell handover request whether TDD timeslot configuration information of a target cell for a handover of the User Equipment needs to be carried in a cell handover command in response to triggering of the trigger unit.

The cell handover command generation unit is configured for generating the cell handover command according to a determination result of the analysis unit and transmitting the cell handover command to the User Equipment through the source cell.

A Base Station according to an embodiment of the invention includes:

a cell handover request unit configured for generating a cell handover request when a cell handover is required for a User Equipment; and a cell handover command transmission unit configured for transmitting to the User Equipment a cell handover command including TDD timeslot configuration information of a target cell for the handover of the User Equipment.

As described above, the embodiments of the invention implement a cell handover in a TDD system by carrying TDD timeslot configuration information of a target cell in a cell handover command instructing a UE to perform the cell handover, so that the UE can acquire a related parameter of a control channel required during a random access from the cell handover command during the cell handover without acquiring the TDD timeslot configuration information from a system broadcast of an adjacent cell, thus reducing a delay due to an interruption of the handover and ensuring that the system can operate normally.

The technical solutions according to the embodiments of the invention can be applicable to both an LTE TDD system and other TDD systems with dynamic scheduling.

Apparently those skilled in the art can make various modifications and variations to the invention without departing from the scope of the invention. Accordingly, the invention shall also be intended to encompass all those modifications and variations provided the modifications and variations come into the scope of the appended claims of the invention and their technical equivalents.

The invention claimed is:

1. A cell handover method, comprising:
   receiving, by a User Equipment for which a cell handover is required, a cell handover command transmitted from a network side in a source cell of the User Equipment;
   determining from the cell handover command, by the User Equipment, whether a target cell operates in a TDD mode and whether the cell handover command carriers TDD timeslot configuration information of the target cell; and
   deducting a parameter of a control channel of the target cell from the TDD timeslot configuration information of the target cell in the cell handover command and implementing the cell handover according to the parameter of the control channel of the target cell, by the User Equipment, upon determining that the target cell operates in the TDD mode and the cell handover command carries the TDD timeslot configuration information of the target cell;
   wherein the TDD timeslot configuration information comprises at least one of:
   a configured timeslot period;
   an uplink or downlink direction of each normal sub-frame;
   a configured length of each special timeslot in a special sub-frame;
   a configured usage of each special timeslot in a special sub-frame; and
   a proportion of TDD uplink timeslots to TDD downlink timeslots.

2. The method of claim 1, further comprising:
   determining from the cell handover command, by the User Equipment, whether the source cell of the User Equipment operates in the TDD mode; and
   deducting the parameter of the control channel of the target cell from TDD timeslot configuration information of the source cell of the User Equipment and implementing the cell handover according to the parameter of the control channel of the target cell, by the User Equipment, upon determining that the target cell operates in the TDD mode, the cell handover command does not carry the TDD timeslot configuration information of the target cell and the source cell operates in the TDD mode.

3. The method of claim 1, further comprising:
   determining from the cell handover command, by the User Equipment, whether the source cell of the User Equipment operates in the TDD mode; and
   determining occurrence of an error of the cell handover command, rejecting the cell handover command for execution and informing the network side about occurrence of the error of the cell handover command, by the User Equipment, upon determining that the target cell operates in the TDD mode, the cell handover command does not carry the TDD timeslot configuration information of the target cell and the source cell of the User Equipment is not in the TDD mode.

4. The method of claim 1, further comprising:
   transmitting, by the network side, the cell handover command to the User Equipment; and
   wherein, the transmitting by the network side the cell handover command to the User Equipment comprises:
   determining, by the target cell of the User Equipment, from a cell handover request transmitted from the source cell of the User Equipment whether the TDD timeslot configuration information of the target cell needs to be carried in the cell handover command; and
   generating, by the target cell, the cell handover command according to a result of the determination, and transmitting the cell handover command to the User Equipment through the source cell.

5. The method of claim 4, wherein, the target cell determines that the TDD timeslot configuration information needs not to be carried in the cell handover command when:
   the target cell does not operate in the TDD mode,
   the target cell and the source cell are the same cell,
   the source cell operates in the TDD mode, and the target cell and the source cell have the same TDD timeslot configuration,
   the source cell operates in the TDD mode, and the target cell and the source cell have the same operating frequency, or
   the User Equipment has acquired the TDD timeslot configuration information of the target cell.

6. The method of claim 5, wherein, the User Equipment has acquired the TDD timeslot configuration information of the target cell by fetching system information of the target cell.

7. The method of claim 6, further comprising:
   informing, by the User Equipment, the network side that the User Equipment has acquired the TDD timeslot configuration information of the target cell by transmitting a measurement report to the network side, when the User Equipment has acquired the TDD timeslot configuration information of the target cell.

8. The method of claim 5, further comprising:
   informing, by the User Equipment, the network side that the User Equipment has acquired the TDD timeslot configuration information of the target cell by transmitting a measurement report to the network side, when the User Equipment has acquired the TDD timeslot configuration information of the target cell.

9. A User Equipment, comprising a first determination unit, a second determination unit and a first processing unit, wherein,
   the first determination unit is configured for triggering the second determination unit upon determining that a target cell for a handover of the User Equipment operates in a TDD mode in response to a cell handover command transmitted form a network side in a source cell of the User Equipment;
   the second determination unit is configured for triggering the first processing unit upon determining that the cell handover command carries TDD timeslot configuration information of the target cell in response to triggering of the first determination unit; and the first processing unit is configured for deducting a parameter of a control channel of the target cell from the TDD timeslot configuration information in the cell handover command and implementing the cell handover according to the parameter of the control channel of the target cell in response to triggering of the second determination unit;

wherein the TDD timeslot configuration information comprises at least one of:

a configured timeslot period;

an uplink or downlink direction of each normal sub-frame;

a configured length of each special timeslot in a special sub-frame;

a configured usage of each special timeslot in a special sub-frame; and a proportion of TDD uplink timeslots to TDD downlink timeslots.

10. The User Equipment of claim 9, further comprising a third determination unit and a second processing unit, wherein, the second determination unit is further configured for triggering the third determination unit upon determining that the cell handover command does not carry the TDD timeslot configuration information;

the third determination unit is configured for triggering the second processing unit upon determining that the source cell where the User Equipment is present operates in the TDD mode in response to triggering of the second determination unit; and the second processing unit is configured for deducting the parameter of the control channel of the target cell from TDD timeslot configuration information of the source cell where the User Equipment is present and implementing the cell handover according to the parameter of the control channel of the target cell in response to triggering of the third determination unit.

11. The User Equipment of claim 10, further comprising an exception processing unit, wherein, the third determination unit is further configured for triggering the exception processing unit upon determining that the source cell where the User Equipment is present is not in the TDD mode; and the exception processing unit is configured for determining occurrence of an error of the cell handover command, rejecting the cell handover command for execution and informing the network side about occurrence of the error of the cell handover command in response to triggering of the third determination unit.

12. The User Equipment of claim 9, further comprising a fetch unit configured for acquiring the TDD timeslot configuration information of the target cell by fetching system information of the target cell.

13. The User Equipment of claim 12, further comprising an informing unit configured for informing the network side about its knowledge of the TDD timeslot configuration information of the target cell by transmitting a measurement report to the network side.

14. A Base Station, wherein, when the Base Station is configured as a Base Station of a target cell for a handover of a first User Equipment, the Base Station comprises a trigger unit, an analysis unit and a cell handover command generation unit, and wherein, the trigger unit is configured for triggering the analysis unit upon reception of a cell handover request transmitted from a source cell of the first User Equipment;

the analysis unit is configured for determining from the cell handover request whether TDD timeslot configuration information of the target cell for the handover of the first User Equipment needs to be carried in a cell handover command in response to triggering of the trigger unit; wherein, the TDD timeslot configuration information of the target cell is used for the first User Equipment to deduct a parameter of a control channel of the target cell and to implement the handover according to the parameter of the control channel of the target cell; and the cell handover command generation unit is configured for generating the cell handover command according to a determination result of the analysis unit and transmitting the cell handover command to the first User Equipment through the source cell of the first User Equipment;

wherein the TDD timeslot configuration information comprises at least one of:

a configured timeslot period;

an uplink or downlink direction of each normal sub-frame;

a configured length of each special timeslot in a special sub-frame;

a configured usage of each special timeslot in a special sub-frame; and a proportion of TDD uplink timeslots to TDD downlink timeslots.

15. The Base Station of claim 14, wherein, the analysis unit determines that the TDD timeslot configuration information of the target cell for the handover of the first User Equipment needs not to be carried in the cell handover command when the target cell for the handover of the first User Equipment does not operate in the TDD mode, the target cell for the handover of the first User Equipment and the source cell of the first User Equipment are the same cell, the source cell of the first User Equipment operates in the TDD mode and the target cell for the handover of the first User Equipment and the source cell of the first User Equipment have the same TDD timeslot configuration, the source cell of the first User Equipment operates in the TDD mode and the target cell for the handover of the first User Equipment and the source cell of the first User Equipment have the same operating frequency, or the first User Equipment has acquired the TDD timeslot configuration information of the target cell for the handover of the first User Equipment.

16. The Base Station of claim 14, wherein, when the Base Station is configured as a Base Station of a source cell of a second User Equipment, the Base Station comprises:

a cell handover request unit configured for generating a cell handover request when a cell handover is required for the second User Equipment; and a cell handover command transmission unit configured for transmitting to the second User Equipment a cell handover command comprising TDD timeslot configuration information of a target cell for the handover of the second User Equipment; wherein, the TDD timeslot configuration information of the target cell for the handover of the second User Equipment is used for the second User Equipment to deduct a parameter of a control channel of the target cell for the handover of the second User Equipment and to implement the handover according to the parameter of the control channel of the target cell for the handover of the second User Equipment; and wherein the TDD timeslot configuration information comprises at least one of:
a configured timeslot period;
an uplink or downlink direction of each normal sub-frame;
a configured length of each special timeslot in a special sub-frame;
a configured usage of each special timeslot in a special sub-frame; and
a proportion of TDD uplink timeslots to TDD downlink timeslots.

17. The Base Station of claim 16, wherein, when the Base Station is configured as the Base Station of the source cell of the second User Equipment, the Base Station further comprises:
means for receiving a measurement report transmitting from the second User Equipment, and obtaining information on whether the second User Equipment has been provided with the TDD timeslot configuration information of the target cell for the handover of the second User Equipment according to the measurement report, wherein, the measurement report comprises the information on whether the second User Equipment has been provided with the TDD timeslot configuration information of the target cell for the handover of the second User Equipment.

18. The Base Station of claim 17, wherein, when the Base Station is configured as the Base Station of the source cell of the second User Equipment, the Base Station further comprises:
means for informing a Base Station of the target cell for the handover of the second User Equipment about the obtained information on whether the second User Equipment has been provided with the TDD timeslot configuration information of the target cell for the handover of the second User Equipment.

* * * * *